Jan. 15, 1957  A. E. GRZENKOWSKI ET AL  2,777,520
MACHINE FOR CUTTING OFF LENGTHS OF TUBING
Filed April 30, 1956  9 Sheets-Sheet 3

Inventors
Alfred E. Grzenkowski
Raymond W. Rademaker
by Attys

Inventors
Alfred E. Grzenkowski
Raymond W. Rademaker
Attys

INVENTORS
ALFRED E. GRZENKOWSKI
RAYMOND W. RADEMAKER
BY Hill, Sherman, Meroni, Gross & Simpson
ATTORNEYS

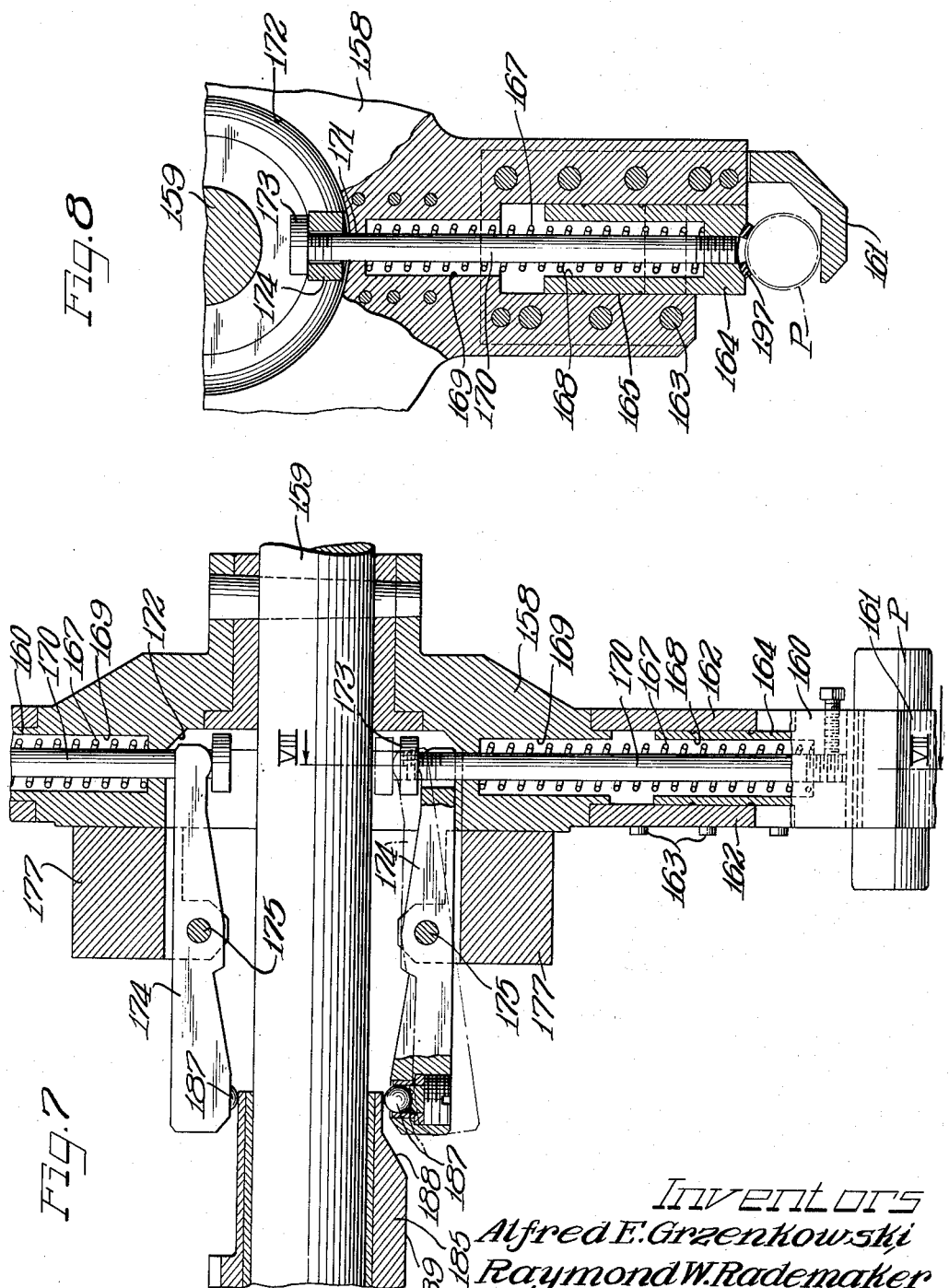

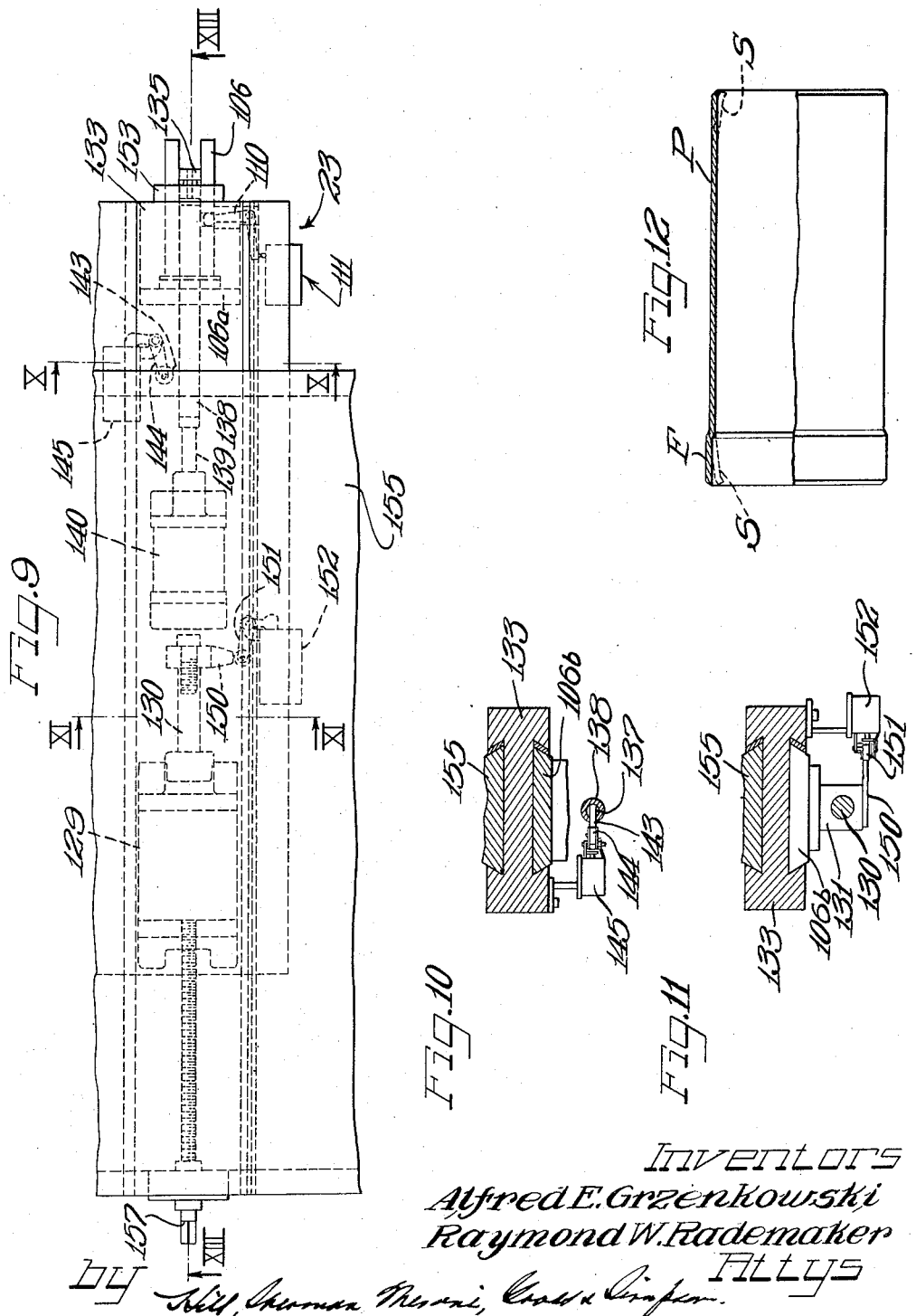

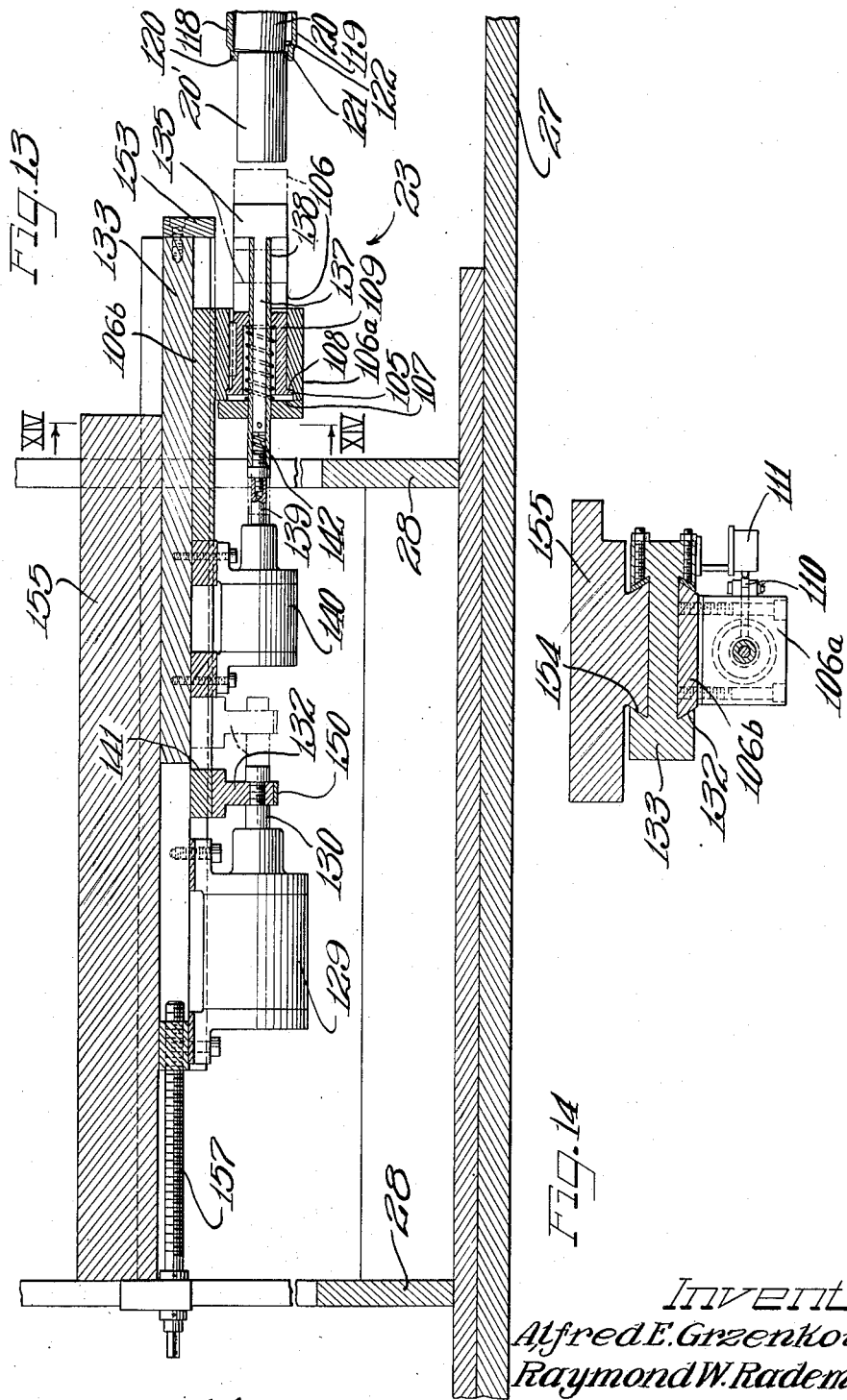

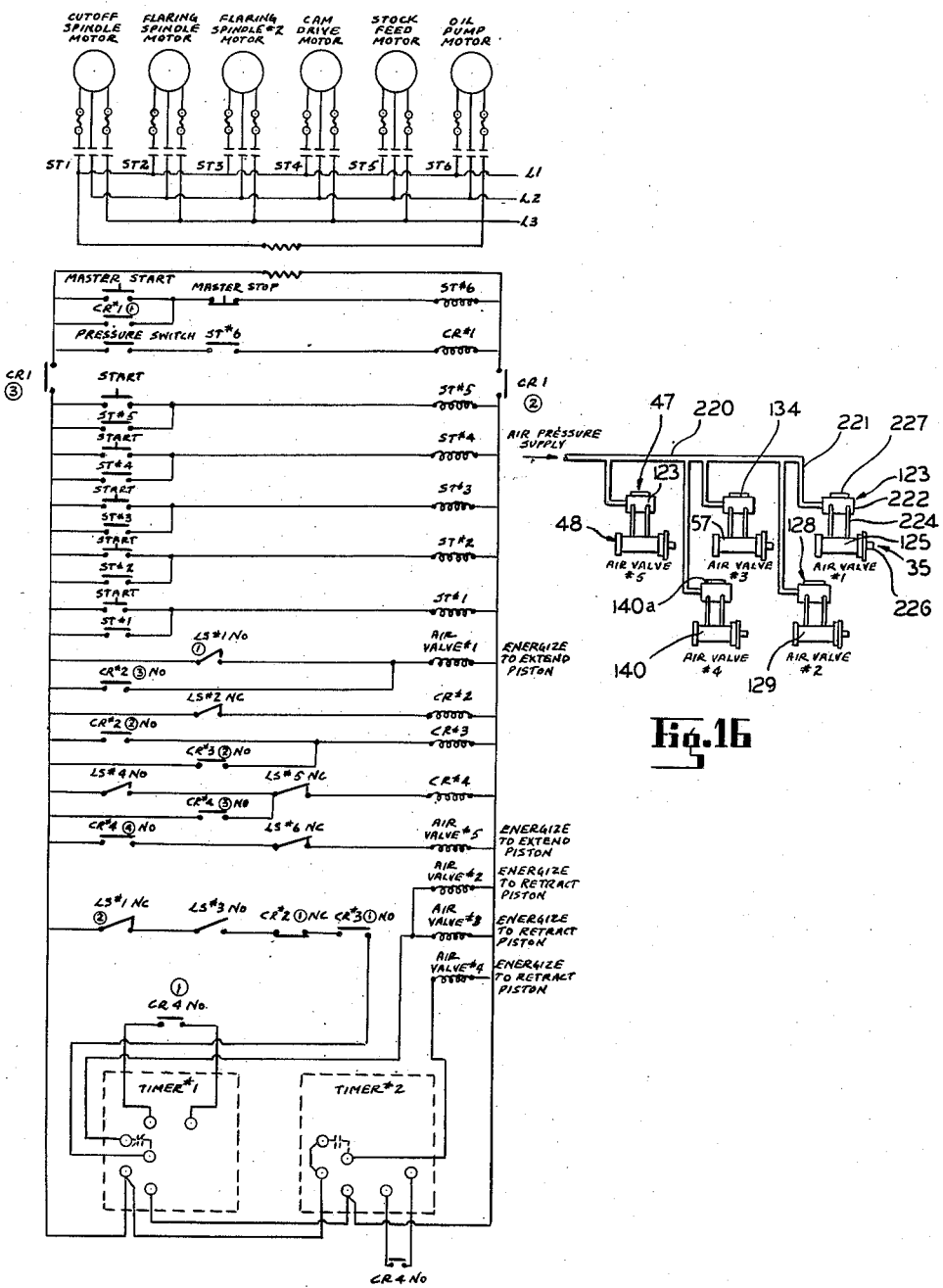

United States Patent Office 2,777,520
Patented Jan. 15, 1957

2,777,520

MACHINE FOR CUTTING OFF LENGTHS OF TUBING

Alfred E. Grzenkowski, Buffalo, and Raymond W. Rademaker, Kenmore, N. Y., assignors to Houdaille Industries, Inc., Buffalo, N. Y., a corporation of Michigan Application April 30, 1956, Serial No. 581,798

9 Claims. (Cl. 164—61)

The present invention relates to improvements in machines for working on tubing and more particularly relates to a machine for cutting metal tubes of commercial lengths into predetermined length relatively short pieces and operating on the ends of the cut tube pieces to straighten and expand the same.

The present application is a continuation-in-part of application, Serial No. 230,454, filed June 8, 1951, entitled "Machine for Cutting Off Lengths of Tubing and Expanding the Ends Thereof," now abandoned.

An important object of the present invention is to provide a machine which is equipped to operate continuously and automatically in the severing of commercial long lengths of metal tubing into useable short pieces of predetermined length and straighten and expand the cut ends of the short lengths in order to eliminate the contraction resulting from the action of the cut-off blades, and also to resize to larger diameter one or both ends of the cut lengths of tube.

Another object of the invention is to provide a machine for severing long lengths of metal tubing into shorter pieces and then sizing the ends of the cut-off tube pieces in a step-by-step continuous, high-speed process.

A further object of the invention is to provide a combination tube cut-off and sizing machine including control means automatically responsive to the tubing acted upon in the machine.

Still another object of the invention is to provide improved means for feeding and controlling the operation of a machine of the character described.

Yet another object of the invention is to provide in a tube cut-off apparatus improved means for ejecting undersized end lengths of tubing.

A still further object of the invention is to provide improved cut-off mechanism for a tube severing machine.

A yet further object of the invention is to provide novel means for engaging and carrying the cut-off pieces of tubing being processed in a combination cut-off and end sizing machine.

Other objects, features and advantages of the present invention will be readily apparent from the following detailed description of a preferred embodiment thereof taken in conjunction with the accompanying drawings, in which:

Figure 7 is an enlarged fragmentary sectional detail view taken substantially on the line VII—VII of Figure 2;

Figure 8 is a sectional detail view taken substantially on the line VIII—VIII of Figure 7;

Figure 9 is an enlarged fragmentary top plan view of the tube actuated control stop mechanism, taken substantially on the line IX—IX of Figure 1;

Figure 10 is a vertical sectional fragmentary detail view taken substantially on the line X—X of Figure 9;

Figure 11 is a fragmentary vertical sectional detail view taken substantially on the line XI—XI of Figure 9;

Figure 12 is a side elevational view, partially broken away, of a piece of tubing that has been cut and end sized in the machine of the present invention;

Figure 13 is a fragmental vertical sectional view taken substantially on the line XIII—XIII of Figure 9;

Figure 14 is a fragmentary sectional detail view taken substantially on the line XIV—XIV of Figure 13;

Figure 15 is a schematic wiring diagram of the electrical circuit for operating the mechanism; and Figure 16 is a schematic diagram of the fluid pressure system for operating the mechanism.

In the production of various articles, such as direct acting or telescopic shock absorbers, it is necessary to provide predetermined lengths of metal tubing of fairly large sizes. Such tubing is produced in commercial lengths many feet long. Since the sections or pieces of tubing for use are only a few inches long, they must be cut from the greater or commercial lengths of tubing. For example, the tubing may be welded seam steel tubing of anywhere from one inch to a substantially greater outside diameter.

Figure 1:
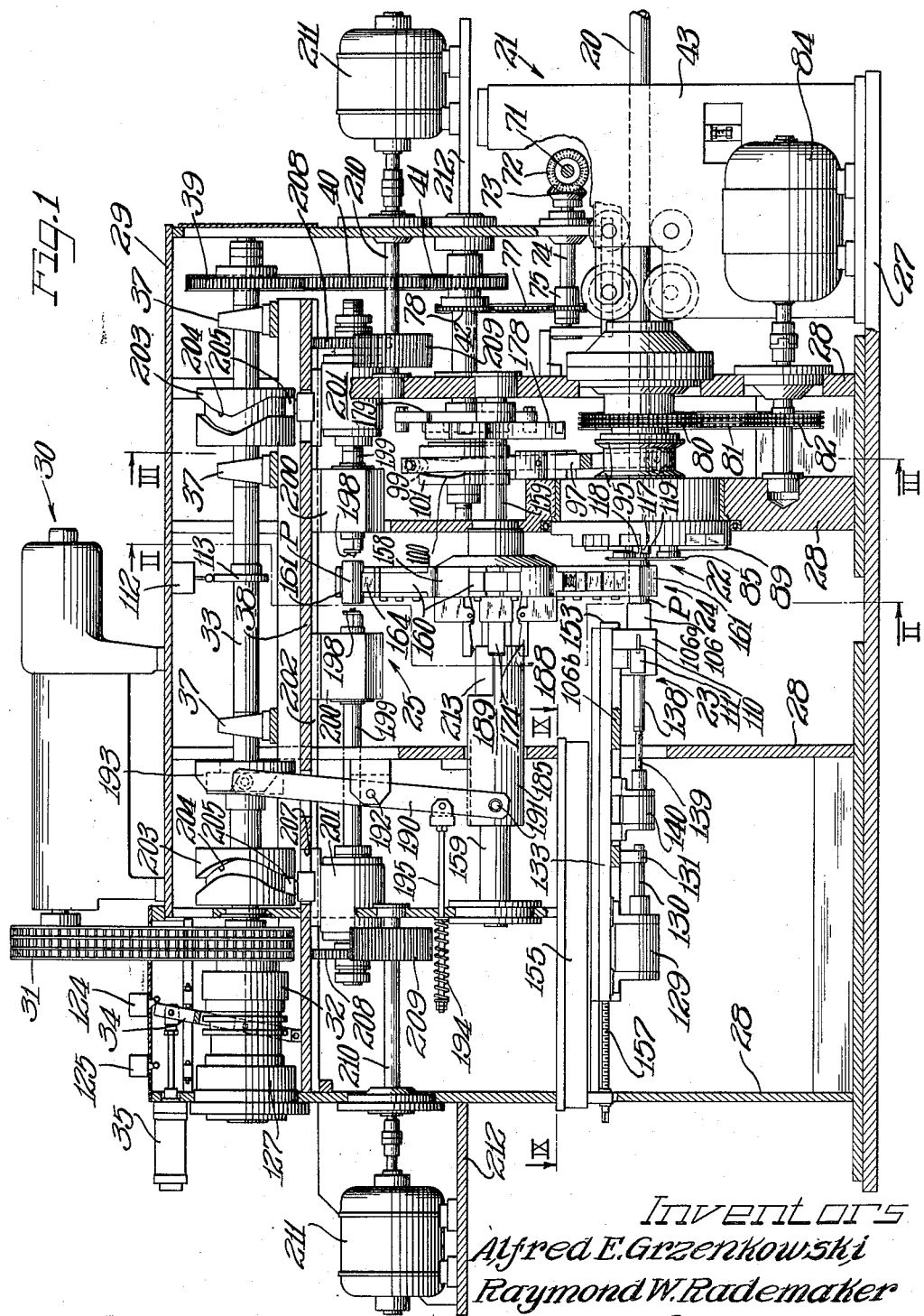
Figure 1 is a longitudinal vertical sectional view through a machine embodying the present invention and taken in more or less composite and irregular planes best adapted to illustrate the general relationship of parts.

In the machine of the present invention, as best seen in Figure 1, a commercial length of tubing 20 is engaged by feed mechanism 21 and advanced to cut-off mechanism at a severing or cut-off station 22 where the advance end of the tubing acts upon control stop mechanism 23 operative to control cyclical operation of the machine. The successive severed predetermined lengths or pieces of tubing are engaged by and moved by a turret carriage 24 to an end sizing station 25 including mechanism operable to return to normal inside diameter or to a slightly greater diameter the cut ends of the piece of tubing which as an incident to the cut-off have been slightly contracted or swaged or distorted inwardly.

All of the several mechanisms of the machine are preferably assembled into a unitary machine structure including a base or supporting plate 27 which may be of elongated rectangular form carrying various parallel spaced upright transversely extending frame members or plates 28 suitably secured in fixed relation and carrying a top plate or deck 29.

Main drive mechanism

Upon the upper or deck plate 29 is mounted a drive motor and speed reducer unit 30 which through a chain belt 31 and a clutch mechanism 32 is adapted to drive a main drive shaft 33. A clutch operator 34 is arranged to be actuated by means such as a fluid motivated operator 35. In the relationship shown, the clutch 32 is indicated in the clutching condition wherein the shaft 33 is connected for rotation by the drive unit 30.

The drive shaft 33 is carried by suitable bearings 37 mounted upon a sub-deck plate structure 38 below the top plate 29. At the end of the shaft 33 opposite the clutch 32 is mounted a sprocket gear 39 over which is trained a drive chain 40 drivingly engaging over a sprocket gear 41 on a driven shaft 42 through the medium of which various mechanisms including the feed mechanism 21, the cut-off mechanism 22, at least in part, and the turret carriage 24 are variously motivated.

The feed mechanism

Figure 4:
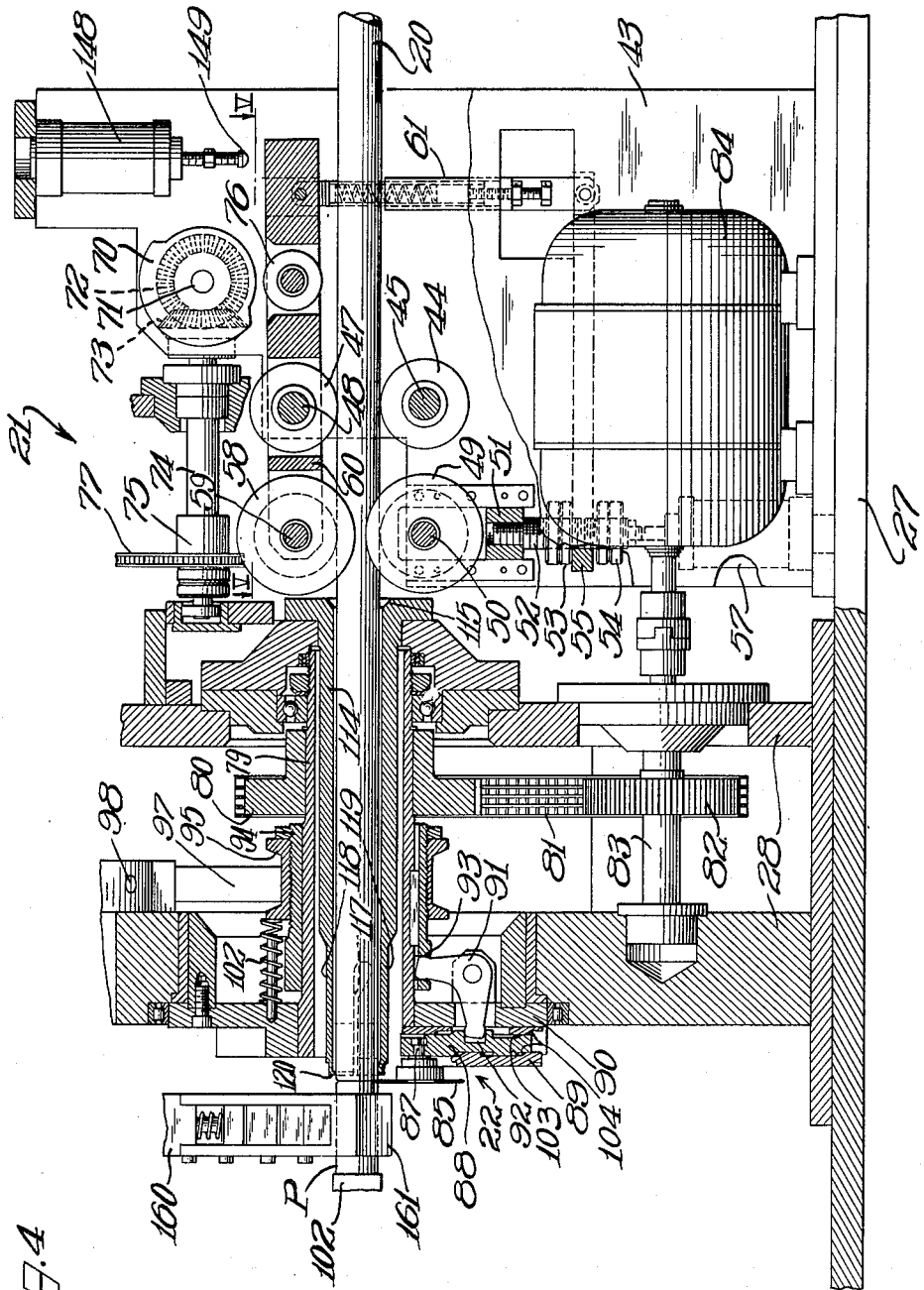
Figure 4 is a sectional detail view taken substantially on the line IV—IV of Figure 2.

As best seen in Figures 1 and 4, the tube stock feed mechanism 21 is supported primarily by a frame structure 43 carried by the base plate 27. A lower idler roll 44 carried rotatably by a shaft 45 cooperates with an upper idler roll 47 on a shaft 48 to support and grip the tube stock 20 therebetween. Both of the rolls 44 and 47 may be rubber tired, and both rolls are freely rotatable. Forwardly from the lower idler roll 44 is an idler roll 49 of grooved periphery freely rotatable on a shaft 50 supported by a vertically reciprocable carriage 51. Depending from the carriage 51 is a threaded stem 52 having thereon spaced apart sets of stop nuts 53 and 54 disposed at respectively the upper and lower sides of a fixedly mounted horizontal member or plate 55 through which the stem 52 extends. At its lower end the stem 52 is connected to a fluid actuated operator 57 by which the carriage 51 is normally urged upwardly to the extent limited by the lower set of stop nuts 54 engageable against the fixed member 55.

Figure 5:
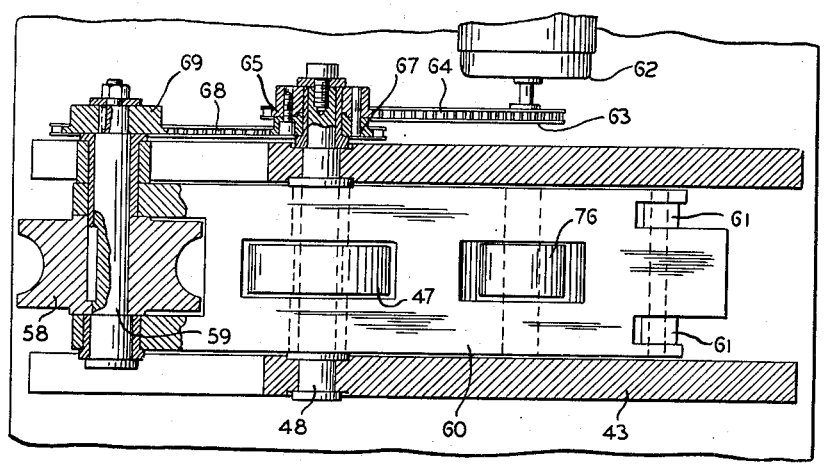
Figure 5 is a sectional top plan view taken substantially on the line V—V of Figure 4.

Since it is desirable to feed the tube 20 by incremental lengths, means are provided which will operate cyclically coordinated with operation of the other mechanisms of the machine for intermittently propelling the tube. To this end, a grooved continuously driven feed roll 58, of preferably substantially the same construction as the grooved idler feed roll 49, is mounted on a shaft 59 journaled on a rocking carriage 60 pivotally mounted on the shaft 48 (Figures 4 and 5). The feed roll 58 may be made from or surfaced with a suitable friction material. By rocking the carriage 60 about the axis of the supporting shaft 48, the feed roll 58 can be moved into and out of driving engagement with the tube 20.

Means for normally urging the rocker carriage 60 about its pivotal axis to urge the feed roll 58 into engagement with the tube 20 comprises one or more, herein shown as a pair, adjustable tension spring loaded telescopic thrust members 61. These thrust members are pivotally connected at their lower ends to the rear end portion of the support member 55 and at their upper ends are pivotally connected to the rear end portion of the rocker carriage 60 at preferably a leverage distance somewhat greater than the spacing of the drive roll shaft 59 from the pivot shaft 48. Thereby, the rocker shaft 60 is normally strongly resiliently rockingly thrust by the thrust members 61 to drive the roll 58 into driving relation to the tube 20 and with sufficient pressure in cooperation with the lower companion idler roll 49 to feed the tube 20 forwardly.

Means for continuously driving the feed roll 58 in the present instance comprise a drive motor 62 having on the drive shaft thereof a sprocket 63 over which is meshed a sprocket chain 64 also meshing over a driven sprocket 65 mounted freely rotatable on the adjacent end portion of the idler roll and rocker carriage supporting fixed axis shaft 48. Fixedly secured to the sprocket 65 is a companion sprocket 67 over which is trained a sprocket chain 68 meshing with a driven sprocket 69 keyed to the adjacent end of the feed roll shaft 59. Thereby the feed roll 58 is adapted to be continuously driven by the motor 62 without interfering with rocking of the rocker carriage 60.

For intermittently rocking the rocker carriage 60 to lift the feed roll 58 from the tube 20, means are provided comprising a cam 70 mounted on a driven shaft 71 journaled in the upper portion of the frame 43. A bevel gear 72 on the shaft 71 meshes with a bevel gear 73 carried by a shaft 74 mounted rotatably parallel to the drive mechanism shaft 42 (Figures 1 and 4) and having keyed thereto a sprocket 75 which has trained thereover a sprocket chain 77 also trained over a sprocket 78 on the shaft 42. In this manner the shaft 71 and the lobed cam 70 are driven from the shaft 42 to turn in timed relation to the other mechanisms of the machine so that an antifriction idler roller 76 carried by the rear portion of the rocker shaft 60 is periodically engaged by the lobe of the cam 70 to rock the rocker carriage 60 clockwise as viewed in Figure 4 to lift the feed roll 58 from the tube 20. The non-driving position of the rocker carriage 60 is maintained for a predetermined interval and then the lobe of the cam 70 rides off of and releases the roller 76 so that the rocked carriage returns to the driving position of the roller 58 for a predetermined interval to advance or feed the tube 20 the desired distance before the cam again disengages the feeder unit.

Cut-off mechanism

Feeding of the tube 20 advances incremental predetermined short lengths thereof at its advancing end portion into position to be cut-off by the cut-off mechanism 22. To this end, the tube 20 advances through an elongated hollow tubular spindle 79 (Figure 4) journaled to rotate substantially concentrically about the feed path of the tube. On its rear end portion the spindle 79 carries a sprocket or chain drive or transmission gear 80 over which a drive chain belt 81 is trained as well as in driven relation to a sprocket or gear 82 carried by a shaft 83 rotatably driven by a motor 84 mounted on the base of the machine. By preference the motor 84 drives the spindle 79 continuously during the operation of the machine.

Figure 2:
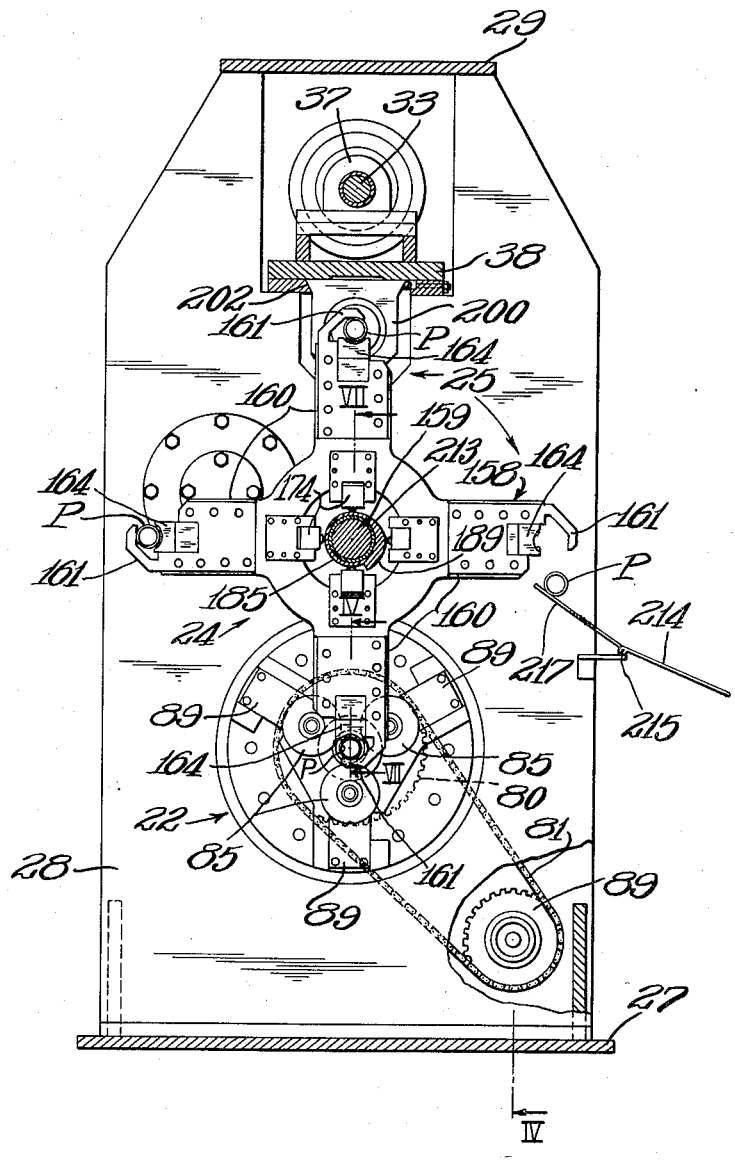
Figure 2 is a vertical sectional view taken substantially on the line II—II of Figure 1.

At its forward end portion, the spindle 79 carries a retractible flying shear structure comprising a plurality of, herein three, rotary shear blades or knives 85 (Figures 1, 2 and 4). Each of the knives 85 has a stub shaft 87 upon which it is freely mounted on a reciprocable slide block 88 movably mounted in a guide housing 89 provided therefor on a rotary head 90 secured upon the forward end portion of the spindle 79. It will be observed from Figure 2 that the three cut-off knives 85 are equidistantly spaced about the head 90.

The cut-off knives 85 are freely rotatably mounted on their respective stub shafts 87 so that as the knives 85 are brought into synchronized cutting engagement with the outer surface of the tube 20 by movement of the slide blocks 88 radially toward the tube while the head 90 is spinning, the blades will roll about the surface of the tube while cutting pressure is applied and thus uniformly sever the leading end portion of the tube from the body of the tube. Synchronization of the cut-off blades is effected by means of bell crank actuators 91 respectively pivotally mounted in the head 90 with a forwardly extending leg of each of the respective bell crank actuators projecting into a socket 92 in the associated slider block 88 and an inwardly directed leg of each of the bell crank actuators engaged operatively within a respective socket 93 in a longitudinally slidable synchronizing sleeve 94 mounted about the spindle 79 and keyed to rotate therewith.

Figure 3:
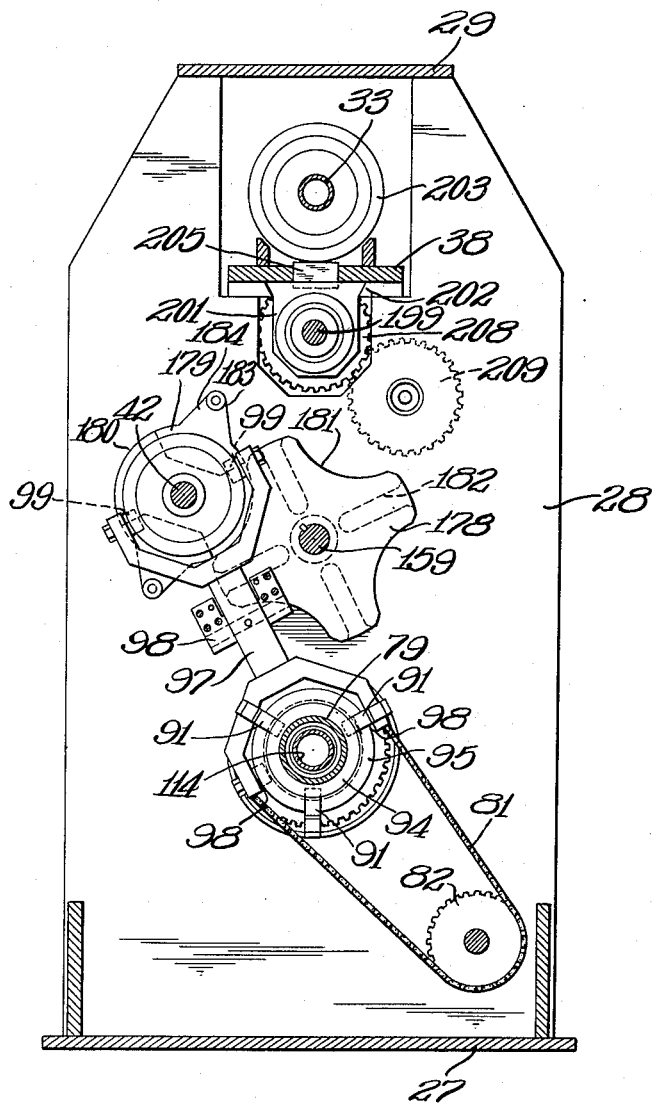
Figure 3 is a vertical sectional view taken substantially on the line III—III of Figure 1.

Means are provided, coordinated in operation with the feed mechanism 21, for periodically backing off the cut-off blades 85 to clear the tube feeding path and then advancing the blades into cut-off cooperative relation to the tube. For this purpose the reciprocable actuating sleeve 94 is provided with a peripherally grooved portion or member 95 engaged by a rocker fork 97 having rollers 98 riding in the grooved periphery of the member 95. By preference the rocker fork member 97 is similarly forked at opposite ends and is intermediately pivoted as at 98, with the forked end opposite that which engages the sleeve carried member 95 provided with rollers 99 engaging within a peripheral groove 100 in a control cam 101 mounted on and rotatable with the shaft 42 (Figures 1 and 3). Through this arrangement, as the shaft 42 rotates it is not only effective to drive the feed control cam 70 but also drives the control cam 101 by which the rocker member 97 alternately shifts the actuating sleeve 94 longitudinally of the spindle 79 and thereby backs off and advances the cutter blades 85 in coordinated relation to the operations of the feed mechanism 21.

In order to assist the rocker member 97 in applying positive cut-off pressure to the flying shear blades 85, the actuating sleeve 94 is preferably spring urged as by means of a plurality of compression springs 102 (Figure 4) in the cut-off direction.

In order to speed the cut-off operation, advance of the cutters 85 into cutting engagement with the tube 20 is preferably closely coordinated with the tube feeding operation to take place in the last portion of each increment of feeding advance of the tube and the blades are therefore given a small initial forward motion as well as radially inward movement. For this purpose, the front and rear sides of the blade carrying slide blocks 88 are provided with respective offset cam portions 103 cooperative with corresponding cam portions 104 in the respective guide housings 89 to impart a rearwardly retracting movement to the blades on backing off and a forward movement when advancing into cutting position, responsive to the corresponding reciprocal movements imparted to the blocks 88 by the bell cranks 91.

*Undersized piece ejector control stop mechanism*

As usually occurs, the trailing end portion of the tube stock 20 will be shorter than the predetermined length required for the pieces of a production run, and for this purpose means are provided for enabling ejection of the undersized piece and then continuous automatic operation of the machine to cut the succeeding tube stock into successive pieces of the predetermined length until the stock tube runs out, and so on. To this end, the control stop mechanism 23 is so organized that while the tube stock is fed in proper incremental lengths continuous cyclical operation of the machine proceeds but when the trailing extremity portion of the tube stock of shorter than the predetermined incremental length is fed to the cut-off mechanism 22, ejection of the undersized terminal extremity piece is effected and the cyclical operation of the machine is interrupted for that purpose.

Figure 6:
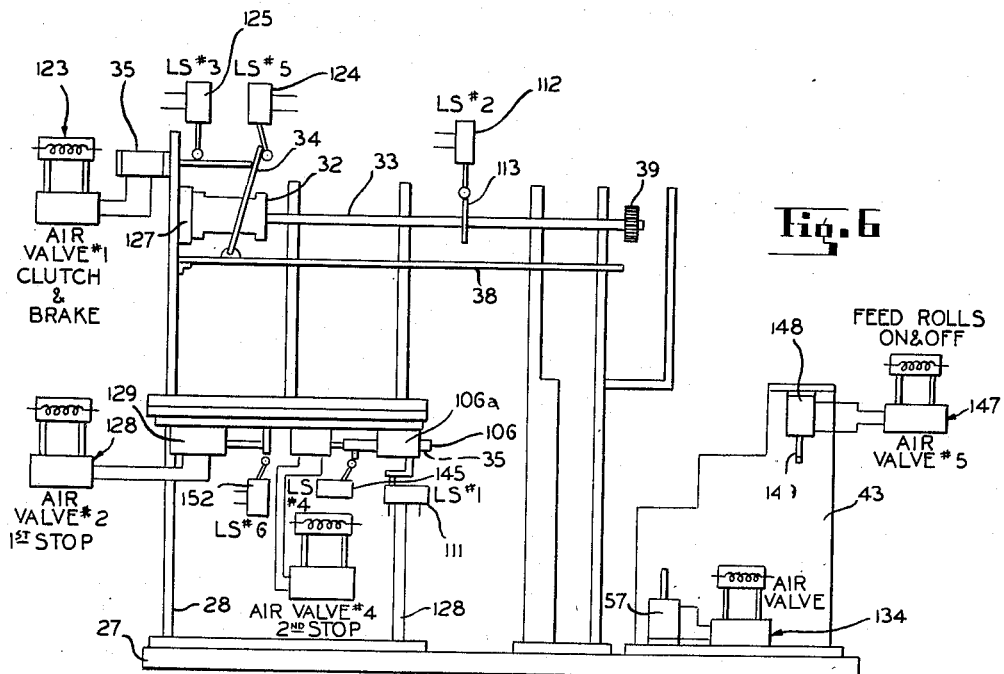
Figure 6 is a schematic view showing the general relationship of various automatic controls utilized in the cyclical and automatic operation of the machine.

Accordingly, each time during operation of the machine that a proper size or length increment of the tube 20 is fed into position with respect to the cut-off mechanism 22, the forward tip of the tube drives against and actuates a spring biased stop member 106 of the control stop mechanism 23 (Figures 1, 9 and 13). A housing 106a mounted on the forward underside of a plate member 106b supports the stop member 106 for limited reciprocal movement as defined by a shoulder 105 working between forward and rear limit shoulders 107 and 108 respectively in the housing. Normally a compression spring 109 urges the stop member 106 into extended position, but when the end of the tube drives against the stop member 106, the spring 109 compresses and permits the stop to move from the limit shoulder 108 to the limit shoulder 107. This movement of the stop member 106 causes a bell crank switch operator 110 (Figures 1, 9 and 14) pivotally mounted at the side of the housing 106a to be rocked by the actuated stop member to thereby close a normally open snap switch 111 (Figures 6, 9 and 13). This is timed to occur in coordinated relation with the opening of a normally closed snap switch 112 by a cam 113 on the main drive shaft 33 (Figures 1 and 6). As a result, the cycle of operations of the machine go forward uninterruptedly.

As the stock tube 20 becomes shorter and the trailing terminus thereof passes the rollers of the feed mechanism 21, a succeeding stock tube 20 is fed into the feed mechanism 21 to push the preceding stock tube on through a tubular member 114 (Figure 4), which is fixedly carried by the frame of the machine concentrically within the tubular spindle 79 and with a beveled mouth 115 closely adjacent to the feed rolls 49 and 58 while the forward extremity of the tube 114 projects beyond the forward end of the spindle 79 but rearwardly clear of the cutters 85. At its forward end, the stationary tube 114 is split as shown at 117 longitudinally and thereby divided into upper and lower segments 118 and 119 which are somewhat resiliently flexible, the lower segment 119 being rendered more flexible by reducing the extent of the connecting wall portion thereof at juncture with the body of the tube 114, as best seen in Figure 4. The internal diameter of the tube 114 throughout its length except at its forward tip is substantially greater than the outside diameter of the stock tube 20. At the inside of the forward end portion of the upper tube segment is provided a radially inwardly directed shoulder 120 preferably extending throughout the width of the tube segment 118. On the other hand, the lower tube segment 119 is provided with a restriction 121 throughout the arc of the segment 119 and to which leads a ramp 122 from the larger diameter portion of the segment 119. The inside diameter of the shoulder portion 120 and the restriction portion 121 is approximately the same as the outside diameter of the tube stock.

When a length of the tubing 20 is first introduced into the tube 114, the fluid operator 57, which may be pneumatically actuated drives the carriage 51 upwardly to the limit permitted by the set of stop nuts 54 and this is sufficient to hold the advancing end of the stock tube 20 upwardly eccentric to the axis of the guide and stop tube 114 while the advancing end of the stock tube pushes the preceding tube on through the forward end of the guide tube and until the tip of the newly introduced and thus succeeding stock tube 20 stops against the stop shoulder 120 as shown in Figure 13. Such stopping of the leading end of the stock tube 20 will, of course, occur only when the trailing extremity portion of the preceding tube, identified at 20' remains as a too short or undersized piece which will fail to thrust against and thus motivate the control stop 106. As a result, the switch 111 is not closed when the switch 112 is opened by action of the cam 113, and this causes an interruption in the operating cycle until the undersized piece 20' has been cleared or ejected.

When both of the switches 111 and 112 are open an electrical control circuit for the machine as will be described in detail in connection with Figure 15, is interrupted or broken and this causes a control mechanism 123 for the fluid operator 35 to be operated to reverse the clutch actuator 34 thereby disengaging the operator 34 from a switch 124 and causing the same to operate a switch 125 and at the same time disengage the clutch 32 and set a brake mechanism 127. As a result the shaft 33 is stopped and an air valve device 128 is actuated to motivate a fluid actuated operator 129 (Figures 1, 6 and 13) having a piston rod 130 attached by a bracket 131 to the rear end portion of the carrying plate member 106b. A dovetail slide interengagement 132 (Figures 10, 11 and 14) with an overhead carriage plate 133 enables the plate 106b to be drawn toward the operator 129. As a result, the stop supporting casing or housing 106a is moved correspondingly and the control stop 106 is withdrawn to a substantial distance affording clearance for subsequent ejection of the undersize end piece of tubing. This relationship is shown in Figure 13 in full lines, the extended, operative position of the stop 106 being shown in dash outline.

At this time, also, an air valve device 134 (Figure 6) is actuated to effect operation of the fluid operator 57 (Figure 4) to draw the shaft 52 downwardly to the limit permitted by the set of stop nuts 53 and thereby enable the leverage afforded by the thrust member 61 on the rocker carriage 60 to act through the feed roller 58 to push the stopped tubing 20 from the stop shoulder 120 and thus permit the tubing to be fed onward to drive the leading end of the undersize piece 20' against a control stop 135 (Figure 13). The control stop member 135 has been exposed by withdrawal of the control stop 106 and is carried on the end of a stem 137 reciprocably slidably mounted in a guide tube 138 attached to the end of a piston rod 139 of a fluid operator 140 which is mounted on the underside of the supporting plate member 133 within a clearance aperture 141 in the slide member or plate 106b and controlled by an air valve 140a. The stop 135 is normally urged a short distance beyond the end of the tube 138 by a compression spring 142 acting against the inner end of the stem 137 within the tube 138. When the leading end of the short, undersize piece 20' drives against the stop 135 the stem 137 is driven inwardly with respect to the tube 138 and a pin 143 projecting laterally from the rod or stem 137 (Figures 9 and 10) actuates a switch operator 144 to operate a switch 145 mounted adjacent thereto upon the carrying member 133. This causes the fluid operator 140 to be actuated to retract the piston rod 139 and thereby retract or withdraw the stop 135 and clear the same from the path of the advancing undersize piece 20' until the latter has been ejected.

Operation of the switch 145 also causes an air valve device 147 to be activated to energize a fluid operator 148 mounted above the rear end portion of the rocker carriage 60 of the feed mechanism (Figures 4 and 6). A plunger 149 is thus driven downwardly by the operator 148 against the uptilted rear end portion of the rocker carriage 60 move the carriage in opposition to the upthrust member 61, generally clockwise as seen in Figure 4 and the feed roller 58 is thus lifted from the tube 20 and the tube comes to a halt until the control stop mechanism 23 can be reset for resumption of cyclical operation of the machine.

At the time that the fluid operator 129 functioned to retract or back off the stop 106, an arm 150 carried by the bracket 131 and extending laterally therefrom moved out of engagement with a switch operator 151 on a switch unit 152 carried by the supporting plate 133 at one side of the assembly (Figures 9 and 11).

After the undersize piece 20' has been ejected as by dropping away from the stop assembly 23, the fluid operators 129 and 140 operate to return the stops 106 and 135, respectively, to their initial position, and the sliding carrying plate 106b assumes a position against a stop 153 carried by the innermost end of the upper plate 133. Thereupon the arm 150 again engages the switch operator 151, and the switch operator 110 associated with the control stop 106 is again in position to operate the switch 111 when the advancing end of the tube 20 drives thereagainst. At this time the plunger 149 is retracted by the fluid operator 148 from the rocker carriage 60 and the feed mechanism 21 resumes normal operations. Likewise, the clutch operator 34 is returned to the clutch connecting position and the drive shaft 33 resumes operation. The machine is now again in condition for continuous cyclical operation to cut off successive predetermined lengths of the tube 20.

It should be pointed out that in order to accommodate the control stop mechanism 23 for various predetermined lengths of cut tube sections, the carrying plate member 133 is preferably longitudinally adjustably mounted as by a dovetail tongue and groove interconnection 154 with a supporting member 155 carried by the frame of the machine (Figures 13 and 14). Longitudinal adjustments of the supporting member 133 may be effected as by means of an adjustment screw device 157.

Carriage turret mechanism

As each piece of proper incremental length tubing P is cut from the end of the stock tube 20, it is engaged by the turret carriage 24 for transportation to the end sizing and flaring station or mechanism 25. To this end, the carriage turret comprises a multi-arm head member 158 (Figures 1, 2, and 7) which is mounted for rotation about a horizontal axis upon a shaft 159 journaled on the machine frame. As will be observed in Figure 1, the shaft 159 extends to a substantial extent beyond the opposite ends of the turret head 158. The head 158 is keyed to rotate with the shaft 159. By preference the head 158 has four equidistantly spaced radially projecting carrying arms 160.

Each of the arms 160 is provided with a fixed carrying jaw 161 of generally hook shape opening in the direction of clockwise rotation of the turret in the operation of the machine, as indicated by the directional arrow in Figure 2. The respective fixed jaw members 161 may be formed separately from the arms proper 160 and include spaced side portions or plates 162 which are secured as by means of screws 163 to the end portions of the arms 160 and with the jaws 161 disposed in spaced relation beyond the ends of the respective associated arms.

Cooperating in tube gripping relation with the respective jaws 161 are movable jaw members 164 (Figures 2 and 8). Each of the movable jaw members 164 comprises an elongated block slidably reciprocable in a socket 165 formed in and opening endwise from the associated arm 160 and closed at the sides by the fixed jaw side plate portions 162.

For moving the jaw members 164 into and out of tube gripping relation to the fixed jaw members 161, each of the movable jaw members has associated therewith biasing means such as a compression spring 167 extending into an inwardly opening socket 168 within the associated movable jaw member and thrusting the movable jaw member outwardly while the inner end portion of the spring is mounted in a socket 169 provided in the turret head 158 in coaxial alignment with the socket 168. The spring 167 is loaded normally to urge the movable jaw member 164 into tube gripping relation toward the fixed jaw member 161.

For moving the movable jaw member 164 in opposition to the bias of the spring 167 to retract the movable jaw member, a stud or stem 170 is secured to the head end portion of the movable jaw member and projects through the biasing spring 167 and slidably through a bearing bore 171 in the turret head 158 to project into a recess or chamber 172 opening from the left side of the hub portion of the head 158 as viewed in Figures 1 and 7. A head 173 is provided on the end portion of the stud member 170 projecting into the chamber 172, and a forked retraction lever 174 is engageable at its forked end with the head 173. The lever 174 is pivotally mounted at 175 on an outwardly projecting respective boss portion 177 provided therefor on the head 158 and with the remaining arm of the lever projecting substantially outwardly beyond the pivot.

Step-by-step rotation of the carriage turret head 158 to carry the arms 160 from one station to the other in the machine is effected in coordination with the other mechanisms of the machine by an intermittent drive mechanism in the present instance conveniently comprising a Geneva gear assembly including a slotted disk 178 keyed to the shaft 159 (Figures 1 and 3) and a tooth or arm disk 179 keyed to the driven shaft 42. The shaft 159 remains stationary while respective segmental peripheral portions 180 of the disk 179 ride in concave peripheral portions 181 in the disk 178 intermediate slots 182 which are periodically entered by rollers 183 on respective arms 184 on the actuator disk 179. Through this arrangement, the arms 162 of the carriage turret are advanced in timed sequence with periods of dwell between the advances.

Each of the carrier turret arms 160 is successively advanced into registration between the cut-off mechanism 22 and the stop mechanism 23 so that as the stock tube 20 is fed to the stop 102, the end portion of the tube enters into position between the fixed jaw 161 and the movable jaw 164 of the registered arm. At this time, of course, the movable jaw 164 must be retracted or opened with respect to the fixed jaw to accommodate the advancing end portion of the tube. For this purpose, a tubular barrel cam member 185 (Figures 1 and 7) is mounted slidably upon the shaft 159 beyond the mouth of the cavity 172 in the carriage turret head 158 and in a position to have the adjacent end of the cam member preferably continuously engaged by antifriction followers such as respective ball bearings 187 carried by the inner sides of the outer ends of the jaw retracting levers 174. The engaged extremity portion of the cam member 185 is of a diameter at the bottom side thereof such that the movable jaw member 164 of the lowermost jaw member is in the tube gripping relation while its follower 187 is engaging said minimum diameter terminal portion. Closely adjacent to said minimum diameter portion, however, is a slanting cam surface 188 upon which the follower 187 is adapted to ride onto a maximum diameter surface portion 189 of the cam member when the cam member 185 is moved longitudinally toward the turret head 158. Thereby the jaw retracting lever arm 174 is caused to swing down at its outer end and up at its inner end to draw the jaw opening stud 170 and thereby move the jaw 164 to its open position as indicated in dash outline in Figure 7.

Reciprocal movements of the barrel cam member 185 are effected by means including a rockable lever 190 and pivotally connected at one end to the barrel cam member 185 and intermediately pivotally connected at 192 to the machine frame above the barrel cam. The opposite end of the rocker lever 190 engages with a cam member 193 keyed to the drive shaft 33. The cam member 193 has lobes which periodically actuate the lever 190 about its pivot 192 to swing the lower end counterclockwise as viewed in Figure 1 in opposition to the biasing tension of a compression spring 194 operative on a tension rod 195 and acting to bias the lever to maintain its cam follower end in engagement with the edge of the ring cam 193.

Periodic timed movement of the cam member 185 to the right as viewed in Figures 1 and 7 is coordinated with the operation of the cooperative mechanisms of the machine to actuate the jaw release lever 174 of the lowermost of the carrying arms 160 and hold the movable jaw 164 of such arm open while the advancing end portion of the stock tube 20 is being fed toward engagement with the control stop member 102. The tube then comes to a halt and the jaw release lever 174 is released by return of the same member 185 and the jaw 164, under the influence of its biasing spring 167, assumes a clamping, gripping engagement with the tube end portion as viewed in full outline in Figures 1, 2, 7 and 8. Spaced gripper pads 197 (Figure 8) on the engagement face or end of the movable jaw 164 grip the tube and hold the same clampingly against the fixed jaw member 161.

After the end portion of the tube 20 has been severed to provide the piece P, the turret carriage 24 is turned a quarter revolution by action of the Geneva gear mechanism 178, 179 and the succeeding arm 160 is brought into position to receive the succeeding end portion of the tube 20, in the cyclical operation of the machine.

*Tube end sizing and flaring mechanism*

Each of the tubing pieces P is successively transported by the carriage 24 into position for operation thereon by the sizing and flaring mechanism 25 which is conveniently disposed in the upper portion of the machine. Since it is desirable to act upon both ends of the tubing pieces P a pair of similar though not necessarily identical, but simultaneously operable, automatically operable internal spinning-type tools 198 are provided (Figure 1). Each of the tools 198 are mounted on the end of a rotary shaft 199 supported adjacent to the tool by a journal carriage 200 and supported adjacent its opposite end by a journal carriage 201.

The journal carriages 200 and 201 are mounted for joint reciprocation to move the shaft 199 reciprocably for carrying the supported tool 198 into and out of operative engagement with the tube piece P to be acted upon. For this purpose, the journal carriages 200 and 201 are supported under the intermediate upper frame plate 38 of the machine upon sliding dovetail way means 202 (Figures 1, 2 and 3). Timed cyclical reciprocation of the journal carriage and shaft assembly is effected by means of a peripherally grooved cam 203 carried by the main drive shaft 33 and having a cam groove 204 within which is engaged a cam follower 205 attached to the journal carriage 201 and projecting up through an appropriate aperture 207 in the supporting plate 38.

Each of the shafts 199 is preferably continuously rotated to spin the supported tool 198 and for this purpose the shaft 199 carries thereon at the outer end portion thereof a keyed driven gear 208 which longitudinally slidably meshes with a drivingg ear 209 fast upon a drive shaft 210 supported by the machine frame. Means for continuously turning the shaft 210 may comprise a prime mover such as an electric motor 211 mounted upon a platform 212 at the side of the machine. By preference each of the spinner tools 198 is thus individually driven by its own motor 211. Therefore, as each of the tube pieces P is at rest in registration between the opposed synchronized spinner tools 198, the tools are moved into operative relation to the opposite ends of the tubular piece and internally work the end margins of the tubular piece. The tools 198 are, of course, retracted from the tubular piece P in time for the turret carriage 24 to clear the finished piece P from the mechanism 25 and register the succeeding piece P therewith.

In Figure 12 is shown an example of the results of the action of a set of the tools 198. One end of the tube piece P has been substantially sized from an inwardly swaged condition as indicated in dash outline at S to substantially cylindrical form conforming to the original diameter of the tube. At the opposite end the tube piece P has been cylindrically flared from the shear-swaged condition S to a cylindrical flare or enlargement F. Of course, where desired the flare F may be bell mouth or curvingly tapered, if desired. Both ends of the tube may be flared. On the other hand both ends of the tube may be sized to the original cylindrical diameter of the tube. Any combination of tube ending may be effected by proper selection of the tools 198.

As each of the turret carriage arms 160 moves away from the tube end sizing and flaring mechanism 25 in the operation of the machine, the follower roller 187 of the movable jaw retracting or opening arm 174 associated with such arm rides onto a ramp or lead-in surface 213 on the associated end portion of the cam member 185 until the follower is on the full diameter peripheral cam lobe portion 189 wherein the movable jaw 164 is fully open as best seen in Figure 2. This releases the finished work piece or tubing section P and it drops down as indicated in dash outline in Figure 2 onto an unloading ramp or chute 214 disposed under the discharge position of the now three-quarter turned arm 160 and leads away from the machine so that the finished piece may drop off into a suitable receptacle. In order to avoid jamming the machine, the unloading chute 214 is preferably pivotally mounted as at 215 on the frame of the machine and thereby should the finished piece of tube P not be released from the arm and be carried onward by the arm, the chute will yield and thus swing clear of the arm and the engaged tube piece P. For clearance of the carriage arm after dropping of the finished tube piece P, a slot 217 is preferably provided in the upper inner portion of the chute 214 to clear the jaw portion of the arm therethrough.

*The electrical circuit*

With reference to Figure 15, to start the operation of the machine as a whole, the "start" switches for the various motors must be separately actuated in the following manner. In most instances, the switches and various components are labeled in the circuit diagram of Figure 15 and, therefore, do not require identifying numbers and in many instances the reference labels are similar to the parts as labeled and illustrated in the other figures of the drawings, such as Figures 6 and 16. In the circuit diagram, the start relays and start switches are labeled with the prefix ST and the control relays and their switches are labeled with the prefix CR. The various contacts of each relay switch are numbered consecutively with an encircled number. In each case the switches of each relay bear the same identifying number as the relay.

The switch labeled "master start" is first actuated. This begins the process to start the operational motors by completing the circuit through the relay coil ST6, thus closing the switch labeled ST6 in the circuit to the oil pump motor to start the oil pump motor for lubricating the bearings. The master start button is of a push button type and must be held until oil pressure is built up in the oil lines to which the "pressure switch" is connected. The oil pressure switch is a safety switch which will automatically open when the oil pressure drops below the setting of the pressure switch to thereby stop the machine. Actuating the pressure switch energizes the coil of relay CR1 through the ST6 switch which has been closed. This closes contact 1 of CR1 relay switch forming a holding circuit through the ST6 relay coil. Contacts 2 and 3 of the CR1 switch close the supply circuit to the rest of the relay and switch control circuitry.

Each of the remaining motors can now be started individually by pressing their respective start buttons. Each of the relay coils ST1 through ST5 will close the switches ST1 through ST5 leading to their respective motors and each of the relay coils will close a holding switch in its circuit also labeled ST1 to ST5 to maintain the circuit through the relay coil. Individual stop switches may be provided in each of the circuits, but the entire group of motors may be stopped at the end of the run or in an emergency by pressing the "master stop" switch. The motors are supplied with electricity through the line indicated at L1, L2, and L3.

With the start of the "stock feed motor" and the "cam drive motor," the feed roll 58 will rotate and begin to move the tube stock ahead.

A length of tubing is now fed into the machine and it feeds forward until it engages the control stop 106 shown in Figure 6 which operates the LS1 switches as shown in Figure 15. Control stop 106 has two switch contacts and when engaged closes the normally open contact which completes the circuit to thereby maintain the circuit to energize solenoid air valve No. 1 which keeps the cam shaft clutch engaged.

Air valve No. 1 was energized at the starting of the machine through switch CR2, contact 2 which is placed in circuit through contacts 2 and 3 of relay switch CR1. When the stock moves against the control stop 106, Figure 6, the cam 113 has rotated to open the switch shown at 112 in Figure 6 and at LS2, in Figures 6 and 15. This of course breaks the circuit through relay CR2 and opens switch CR2, and contact 3 opens in the circuit to the air valve No. 1. Thus the circuit through air valve No. 1 will be kept closed only if the control stop 106 is depressed to close switch LS1, contact 1. If a short trailing end of the tube arrives however, control stop 106, LS1, will not be closed and the clutch will be disengaged to temporarily stop the cam shaft 33.

During normal operation, however, LS1, contact 1, is closed by the forward end of the tube stock. The end of the tube stock is then cut off and indexed away from the control stop 106. When LS1, contact 1, is released, LS2 will again have been closed by further rotation of the cam 113 to energize the CR2 relay and close the CR2 switch, contact 3, to maintain the air valve No. 1 energized and the clutch engaged.

When relay CR2 is energized by LS2, contact 1 of switch CR2 opens to insure an open circuit to air valve No. 2 to prevent accidentally retracting control stop 106 by operation of air valve No. 2. This also prevents operation of air valve No. 3.

CR2 relay contact 2 energizes the CR3 relay which holds itself energized with its own holding switch CR3, contact 3.

It is to be noted that if the machine is started at the part of the cycle with the LS2 switch open, it must first complete this first cycle before cam 113 closes LS2 to energize relay CR2 and energize CR3 relay coil through switch CR2, contact 2. The CR3 switches control the ejection of the scrap end of tube stock and this energization after starting the machine prevents the machine from going through the cycle to eject the scrap end of stock tube, when the machine is turned on automatic operation without being in the proper position of its cycle. This could happen if the machine were turned on when LS2 was open and there were no tube present to close switch LS1.

With the clutch engaged and the machine going through its cycle, the cam shaft 33 revolves to move the tube stock ahead and to operate the cutters and to index cut-off tube end away from the cut-off station. As soon as the arm holding the cut-off end of the tube clears the path of the stock tube as it is fed into the machine, the stock tube is moved forward to again engage end stop 106.

If for any reason the end of the stock tube being fed into the machine does not engage the first end stop 106 and actuate limit switch LS1 before cam lobe 113 engages limit switch LS2 and opens its contacts to deenergize the CR2 relay coil, the machine stops because the clutch is disengaged by deenergization of air valve 1. When this happens the control stop 106 retracts to expose the second control stop 135. Limit switch LS3 has been closed by the clutch actuating lever, Figure 6, to energize the No. 2 solenoid air valve, which withdraws the first control stop 106, and the second control stop 135 is thus exposed. Tubing then fed into the machine against the second end stop 135 will complete the cycle to eject the scrap end of stock tube and the machine will then resume its normal cycle.

The clutch actuating lever 34, which has been holding limit switch LS5 open, when moving to the disengaged position, releases limit switch LS5, 124, in Figure 1, allowing its contacts to close and engages limit switch No. 3, 125 in Figure 1, closing its contacts in the solenoid air valve No. 2 circuit through switch CR2, contact 1, which is normally closed. Also, in this circuit is the CR3 switch, contact 1, which is normally open but is closed at this time, and the timer No. 1 contacts which are normally closed. Contact 2 of limit switch 1 still remains closed, not having been engaged due to the short end of the tube stock. Thus air valve No. 2 and air valve No. 3 are actuated.

Air valve No. 2, by operation, retracts the first end stop 106 and exposes the second end stop 106a. The end stop 106 in moving to retracted position also releases normally closed limit switch LS6 to permit it to close.

Reviewing the foregoing and starting at the beginning of the ejection cycle, when a short end of tube stock appears and is too short to engage control stop 106, and close LS1 and when LS2 is opened, the circuit to the air valve No. 1 will be open and air valve No. 1 will disengage the clutch and apply the brake to cam shaft 33.

In the meantime, when the operator notices that the stock tube has become shorter, he feeds a succeeding stock tube into the feed mechanism to push the preceding stock tube forward. The succeeding stock tube, however, stops against the stop shoulder 120 as shown in Figure 13. In order to push the too short or undersized piece of tube forward by the succeeding tube, it must be dislodged from the shoulder. This is also accomplished by the closing of limit stop switch 3 by the clutch arm LS3 which has closed the circuit to air valve 3 in the manner above described. The air valve 3 operates the fluid actuator 57 shown in Figure 6 to draw down the shaft 52, Figure 4, to the limit permitted by the set of stop nuts 53 to thereby enable the leverage afforded by the thrust member 61 on the rocker carriage 60 to act through the feed roller 58 to push the tubing 20 from the stop shoulder 120 and thus permit the tubing to be fed forward to drive the leading end of the undersize piece against the second control stop 135 (Figure 13). This control stop member 135 has been exposed by withdrawal of the first control stop 106.

When the first control stop 106 is first withdrawn, limit switch LS6 is released. Limit switch 6 is normally closed and has been held open up to this time. It will not, however, complete the circuit through air valve 5 until contact 4 of relay switch 4 closes. This contact is closed by the short end of tube stock being pushed forward by the succeeding tube to engage the control stop 135 which operates limit switch 4, which is carried on control stop 135. Closing limit switch 4 completes the circuit through relay CR4 in circuit with limit switch 5 which is now closed by virtue of the clutch being disengaged. Relay CR4 closes contact 3 of relay switch CR4 to form its own holding circuit and this circuit remains closed until the limit switch 5 is again opened by the clutch being engaged. Relay CR4 also closes contact 4 of relay switch CR4 which, as previously stated, completes the circuit to air valve No. 5 through normally closed limit switch 6 which has been released by withdrawal of the control stop 106. Air valve 5 operates the fluid operator 148, Figure 6. This drives the plunger 149 downwardly against the rear end portion of the rocker carriage 60 to move the carriage in opposition to the upthrust member 61, generally clockwise as seen in Figure 4, and the feed roller 58 is thus lifted from the tube 20 and the tube comes to a halt.

The other contacts 2 and 4 of relay CR4 close to energize the timers 1 and 2. The contacts of timer 2 close immediately to complete the circuit to air valve No. 4. This operates the fluid actuator 140 in Figure 6 to withdraw the second control stop 135. This gives the undersize piece room to drop from the machine.

The timer contact of timer 2 stays closed for a measured time interval (such as one second) and then opens, allowing the second control stop 135 to return to its normal position.

When timer 1 is energized, its normally closed contacts stay closed for a measured time interval (on the order of one and one-half seconds) and then open to deenergize air valve 2 and air valve 3 and the first control stop 106 carrying limit switch 1 returns to its normal position. When control stop 106 returns to the normal position, it engages limit switch 6 to open it, and this opens the circuit to air valve 5 permitting the fluid actutator 148 of Figure 6 to permit the rocker carriage 60 of the feed mechanism to return to normal position in order that it may again feed the tube stock forwardly. Since the clutch has been disengaged, the cam 113 has not been rotating and limit switch 2 has not closed to energize relay CR2 and close relay switch CR2, contact 3. This maintains the air valve 1 in a deenergized position and the clutch remains disengaged. However, when the new tube stock is fed forward to engage limit stop 1, the circuit is again completed through air valve 1 to engage the clutch. This will again cause rotation of the cam to operate limit switch 2 and return relay CR2 to its normal operation. The clutch lever returning to its normal position releases limit switch 3 to its normally open position. The clutch lever in assuming the engaged position also actuates limit switch LS5 to deenergize the relay CR4 coil. Relay CR4 contacts 1 and 2 open to reset the timers. The machine is now again in normal automatic operation.

The fluid pressure system

As is illustrated in Figure 16, fluid pressure for operation of the fluid actuators is obtained through a common pipe 220. The fluid pressure which is preferably in the form of air pressure may be furnished from a power driven air compressor of any desirable type. The fluid actuators are all shown in the form of air valves 1 through 5 and are connected to the main pipe 220 in a similar fashion. The fluid actuators are each operated through individual control valves in the same manner and therefore only one actuator and valve need be described in detail.

As is illustrated for the air valve 1, the pipe 221 connects to the main air line 220 and leads to a valve body 222. The valve body is preferably of a type known as a 4-way valve provided with four ports. One port is connected to the inlet pressure pipe 221 and two of the valve ports are connected to control lines 223 and 224 leading to the actuator cylinder 225. The 4-way valve is also provided with a port vented to atmosphere which is not shown.

The cylinder has a piston slidable therein and connected to a piston rod 226, and for movement of the piston and operation of the rod 226 air is admitted at one side of the piston within the cylinder and is vented from the opposite side.

For controlling the 4-way valve a solenoid actuator 227 is provided. The solenoid valve 227 operates the valve to direct air pressure either to the air line 223 or 224. The air line which is not pressurized will be connected to the port of the valve that is vented to atmosphere, thereby insuring movement of the piston within the cylinder and consequent movement of the piston rod 226. Thus each of the fluid actuators or cylinders, broadly termed air valves, are operated by an electrically controlled solenoid which is operated through the switches of the circuit diagram as previously described.

Summary of operation

Although the overall operation of the machine is believed to be clear from the foregoing description, especially from the description of the circuit diagram, a summary of operation will be helpful in understanding the objectives, advantages and features of the invention. In operation, a length of commercial tubing 20, Figures 1 and 4, is fed forward into the machine by a continuously driven feed roll 58. The tube is pressed against the feed roll by the idler roller 49 which is supported against the tube stock by the vertically reciprocable carriage 51. Idler rollers 45 and 47 behind the feed roller aid in supporting the tube. Intermittent forward movement of the tube is obtained by lifting the feed roller 58 upwardly from the tube from time to time and this is accomplished by pivoting the carriage 60 which carries the feed roller. To achieve this, the lobe of the cam 70 engages a follower roller 76 at periodic intervals to pivot the carriage 60 and thereby lift the feed roller 58 off the tube. This is accomplished during the time the short workpiece end is being cut from the tube and the workpiece is being transported away from the cut-off station by the turret mechanism 24.

As the tube stock 20 is moved forward, it engages the control stop 106. At this point, three shear blades or knives 85 move inwardly toward the tubing, being carried on the rotatable spindle 79, Figures 1, 2 and 4. The short end of tubing that is cut from the length of stock tube is gripped between a fixed carrying jaw 161 and a movable jaw 164, Figures 2 and 8. The movable jaws are carried on the ends of stems 170 which are operated by rocker arms 174, actuated by a cam 185, Figures 7 and 8. As the tube end is gripped between the jaws, it is carried upwardly by the turret carriage 24 to an end sizing station 25 which contains mechanism operable to return the inside diameter to normal size. For this purpose tools 198, Figure 1, are constantly driven in rotation and are moved axially into the ends of the short length of tube. This movement is accomplished by the action of the barrel cams 203 on the followers 205. After having been sized and flared, the finished workpiece is carried down to be dropped on an unloading ramp or chute 214 shown in Figure 2, and the movable jaw 164 is retracted to drop the workpiece. This completes the action performed on the tubing, all of which is performed automatically and sequentially with the plurality of operations being performed on the workpieces and the stock of tubing concurrently.

When the trailing end of the supply length of tubing 20 arrives in the cutting station, it usually will be too short to form a full sized workpiece. A succeeding length of tubing will be fed into the machine following the end of the previous length but the forward end of this succeeding length will be caught on the shoulder 120, Figure 4, and prevented from moving forward. The short length of the end of the preceding tubing will fail to engage the control stop 106 and this, through the switching arrangement shown in the circuit diagram, due to the engagement of the switch 112 by the lobe of the cam 115 shown in Figure 1, will disengage the clutch by operating air valve No. 1, which controls the fluid actuator 35, and throw the clutch lever 34 to the left as is shown in Figure 1. The clutch lever 34 moving to the disengaged position will apply a brake to stop the cam shaft 33 and will also release the switch 124 and engage the switch 125. This causes a sequence of operations which will permit ejection of the short trailing end of tubing. The end stop 106 will first be retracted by actuation of the fluid actuator 129 to thereby expose the end stop 135 shown in Figure 13. At this same time, the idler roller 49 is lowered by actuation of the flow fluid actuator 57 shown in Figure 6. This permits the pressure of the upper feed roller 58 to force the tubing downwardly away from the shoulder 120 which has been holding it and has been preventing it from being forced forward by the feed roller 58. The short trailing end of the previous tubing is then forced forward ahead of the succeeding tubing to where it engages the exposed second control stop 135. The fluid actuator 148, Figure 4, is then operated to force down the plunger 149 pivoting the carriage 60 and lifting the feed roller 59 from the tube stock to prevent any further forward motion of the succeeding length of tube stock. The second control stop is then withdrawn by operation of the fluid actuator 140, Figure 13, and this permits the short trailing end of the preceding tube to drop down from the machine into discard. Through operations of the timers as explained in connection with the circuit diagram of Figure 15, control stop 135 is first returned to its normal position followed by control stop 106. When the first control stop 106 is returned to its operative position, the fluid actuator 148 again permits the drive roller 58 to move against the length of tube stock and the tube stock feeds forward to where it engages control stop 106. This again swings the clutch arm 34 back to its engaged position and releases the brake on the cam shaft 33. The machine then returns to its normal operation and will continue through the normal operating cycle until the length of tubing 20 is cut up into smaller workpieces.

Thus it will be seen that we have provided an improved automatic machine which performs a complete function on a length of tubing and operates to meet the objectives and advantages hereinbefore set forth. The elements of the mechanism cooperatively treat the tubing to cut successive workpieces from the end thereof, to tool the inner ends of the cut workpieces to return them to normal diameter, to remove the effects of the cutting tool, and to discharge the workpieces from the machine in their finished state.

The machine is designed in accordance with the principles of the invention so as to utilize a single control cam shaft for coordinating the operations of the various stages, including the feeding of the tube, the cutting of the end from the stock, the transporting of the end to the end treating station, the enlarging of the end, and the transporting and discharging of the completed piece from the machine.

The machine is completely automatic in that no manual operation need be performed nor need the machine be stopped when a shortened end of the tube stock passes through the machine, and the machine will automatically eject the useless short end. After the ejection of the shortened end the machine will automatically return itself to normal operation.

We have, in the drawings and specification, presented a detailed disclosure of the preferred embodiment of our invention, but it is to be understood that we do not intend to limit the invention to the specific form disclosed but intend to cover all modifications, changes and alternative constructions and methods falling within the scope of the principles taught by our invention.

We claim as our invention:

1. In combination in a machine of the character described, means for intermittently feeding succeeding lengths of stock tubing to a cutting station, means for cutting pieces of predetermined size from the forward end of the stock length at the cutting station, means for carrying the cut pieces of predetermined size from the cutting station, and means responsive to the feeding of the trailing end of the stock tubing of a length of less than said predetermined size to the cutting station causing the trailing end to be ejected from the cutting station so that it is not received by said carrying means.

2. In combination in a machine of the character described, means for intermittently feeding succeeding lengths of stock tubing to a cutting station, means for cutting pieces of predetermined size from the forward end of the stock length at the cutting station, means for carrying the cut pieces of predetermined size from the cutting station, and means responsive to the feeding of the trailing end of stock tubing of a length less than said predetermined size to the cutting station stopping operation of the carrying means and causing the trailing end to be ejected from the cutting station.

3. In combination, a machine of the character described, means for feeding a stock length of metal tubing endwise, cut-off means disposed in the path of feeding movement of the tubing for cutting off pieces of the advancing end portion of the stock tubing, means carrying the cut pieces of tubing away from the cut-off means, means controlled by the advancing end of the stock for controlling the feeding and cut-off means and being positioned forwardly of the cut-off means in the path of the advancing stock, means responsive to normal lengths of stock fed forwardly of the cutting means by the feeding means to continue the operation of the feeding and cutting means, stop means interposed between said feeding means and said cut-off means and engageable with the leading end of a succeeding length of tubing when the trailing end of a preceding length of stock tubing has passed beyond the stop means whereby advance of the succeeding length of stock tubing is halted incident to ejection of the trailing end portion of the preceding length of stock tubing, means responsive to a shorter than normal trailing end of stock extending forwardly of the cutting station for stopping the operation of the cutting means and disengaging the leading end of the succeeding workpiece from the stop means and causing it to move forwardly and eject the preceding short length of stock whereby the short length is not received by the carrying means, and means responsive to the short length of stock being moved forward and ejected from the machine to cause the machine to resume its feeding and cutting operations.

4. In combination in a machine of the character described, means for feeding a stock length of metal tubing endwise, cut-off means disposed at a cutting station in the path of feeding movement of the tubing for cutting off pieces from the advancing end portion of the tubing, means for removing the cut pieces of tubing from the cut-off means, size responsive means positioned to be controlled by the advancing end of the stock piece for controlling the operation of the feeding and cut-off means and operative to stop the feeding and cut-off means when a shorter than normal trailing end of stock appears at the cutting station, stop means interposed between said feeding means and said cut-off means and engageable with the leading end of a succeeding length of tubing when the trailing end of a preceding length of tubing has passed beyond the stop means, whereby advance of the succeeding length of tubing is halted incident to ejection of the trailing end portion of the preceding length of tubing, and means to eject the shorter than normal trailing end of stock from the cutting station so that it will not be received by the removing means.

5. In combination in a machine of the character described, means for feeding a stock length of metal tubing endwise, cut-off means disposed at a cutting station in the path of feeding movement of the tubing for cutting off pieces from the advancing end portion of the tubing, means for carrying the pieces from the cutting station, size responsive means positioned to be controlled by the advancing end of the stock piece for controlling the operation of the feeding and cut-off means and operative to stop the feeding and cut-off means when a shorter than normal trailing end of stock appears at the cutting station, stop means interposed between said feeding means and said cut-off means and engageable with the leading end of a succeeding length of tubing when the trailing end of a preceding length of tubing has passed beyond the stop means whereby advance of the succeeding length of tubing is halted incident to ejection of the trailing end portion of the preceding length of tubing, said stop means comprising an internal shoulder at the end portion of a guide tube through which the tubing is fed, and dislodging means operatively connected to the size responsive means and operative to dislodge the succeeding length of tubing from the shoulder in response to the size responsive means detecting a shorter than normal trailing end, said succeeding length pushing the short trailing end from the cutting station and preventing it from being received by said carrying means.

6. In combination in a machine of the character described, means for feeding a stock length of metal tubing endwise, cut-off means disposed at a cutting station in the path of feeding movement of the tubing for cutting off pieces from the advancing end portion of the tubing, means for carrying the cut-off pieces away from the cutting station after being cut, first stop means positioned in the path of the advancing tube end and controlling the cut-off means and operative to stop the cut-off means when a shorter than normal trailing end of stock appears at the cutting station, and second stop means positioned forward of the first stop means in the path of the advancing tube and controlling the feeding means when engaged by said shorter than normal trailing end pushed forward by a succeeding length of tubing, said succeeding length of tubing pushing the short trailing end from the cutting station whereby it is not removed by said carrying means.

7. In apparatus of the character described, means for intermittently feeding a stock length tubing endwise by incremental predetermined short lengths to a cutting station, means at said cutting station coordinated with said feeding means for cutting off said predetermined short length of tubing from the leading end portion of the stock length of tubing, means for carrying said cut predetermined short length from the cutting station, a first stop member engageable by the leading end of the tubing and operatively connected to the cutting means and feeding means for continuing operation with each cycle when engaged by the tubing, means responsive to the failure of the first stop member to be engaged operative to retract said first stop when the trailing end portion of the stock length of tubing runs out to an undersized length shorter than said predetermined length and operative to stop the cutting means, a second stop engageable by the undersized piece when fed thereagainst by a succeeding stock length of tubing fed by said feeding means, said succeeding stock length pushing said undersize length from the cutting station, and means responsive to engagement of the second stop operative to stop the feeding means and to return said first stop to the return position and to subsequently start the feeding and cutting means to resume operation of the machine.

8. In combination in apparatus including means for feeding stock lengths of tubing to a cutting station, means for cutting off ends of predetermined length from the stock length, and means for carrying the ends from the cutting station, the combination comprising a control mechanism for predetermining the cyclical operation of feeding, cut-off and carrying mechanisms, a pair of relatively reciprocably related stop members adapted to be engaged by the end of an endwise fed stock tube length, a first reciprocable carriage supporting the first stop member, a second reciprocable carriage supporting the second stop member, cyclical control mechanism operative to withdraw the first stop member at a predetermined point in the cycle of operation if the stop member is not engaged by the trailing short end of the tube, the trailing end being pushed toward the stop members by a succeeding length of stock tube and means operable by engagement of the second stop member by the trailing end of the tube to operate the carriage supporting the second stop member to withdraw said second stop member and to subsequently move second stop member to return position and said first stop member to return position for continued operation, the withdrawal of the second stop member permitting the trailing end to drop from its position so that it will not be received by the carrying means.

9. An apparatus of the character described, means for feeding a length of stock tubing endwise to a cutting station, means for cutting work pieces from the end of the tubing at the cutting station, means for carrying the cut work pieces from the cutting station, a first stop member engageable by the leading end of the tubing and positioned in the path of the tubing, a second stop member positioned in the path of the tubing after the first stop member, cyclical control means operatively connected to the first stop member to stop the cutting means if the first stop is not engaged by the trailing short end of the length of stock tubing at a predetermined point in the operation of the machine, said cyclical control means also withdrawing the first stop from its position in the path of the tube and exposing the second stop member, and second control means responsive to engagement of the second stop member by the trailing end of the tubing as it is pushed forward by a succeeding length of tubing and operative to stop the feeding means and withdraw the second stop to permit the length of tubing to be dropped and not be received by the carrying means and to subsequently return the second stop member and the first stop member to the return positions, the control means also operative to again start the feeding means to engage the first stop member to again begin the cycle of operation of the machine.

References Cited in the file of this patent
UNITED STATES PATENTS

| | | |
|---|---|---|
| 1,440,492 | Rankin | Jan. 2, 1923 |
| 2,639,491 | Rose et al. | May 26, 1953 |